United States Patent
Hirose

(10) Patent No.: US 6,709,590 B1
(45) Date of Patent: Mar. 23, 2004

(54) COMPOSITE REVERSE OSMOSIS MEMBRANE AND METHOD FOR PRODUCING THE SAME

(75) Inventor: Masahiko Hirose, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/636,226

(22) Filed: Aug. 10, 2000

(30) Foreign Application Priority Data

Mar. 23, 2000 (JP) ........................................ 2000-081317

(51) Int. Cl.$^7$ ............................................... B01D 39/00
(52) U.S. Cl. ............. 210/500.38; 210/490; 210/500.37; 427/244; 427/245; 624/41; 624/48; 624/49
(58) Field of Search ........................... 210/500.38, 490, 210/500.37, 652; 427/244, 245; 264/41

(56) References Cited

U.S. PATENT DOCUMENTS

| | | | |
|---|---|---|---|
| 3,951,920 A | * | 4/1976 | Senoo et al. |
| 3,993,625 A | * | 11/1976 | Kurihara et al. |
| 4,277,344 A | | 7/1981 | Cadotte ....................... 210/654 |
| 4,388,189 A | * | 6/1983 | Kawaguchi et al. |
| 4,695,383 A | * | 9/1987 | Konagaya et al. |
| 4,758,343 A | * | 7/1988 | Sasaki et al. |
| 4,761,234 A | | 8/1988 | Uemura et al. ........ 210/500.38 |
| 4,778,596 A | * | 10/1988 | Linder et al. |
| 4,872,984 A | | 10/1989 | Tomaschke ............ 210/500.38 |
| 4,885,091 A | * | 12/1989 | Swedo et al. |
| 4,948,507 A | | 8/1990 | Tomaschke ............ 210/500.38 |
| 4,960,518 A | * | 10/1990 | Cadotte et al. |
| 4,988,444 A | * | 1/1991 | Applegate et al. .......... 210/636 |
| 5,051,178 A | | 9/1991 | Uemura et al. ........ 210/500.38 |
| 5,173,335 A | * | 12/1992 | Arthur |
| 5,271,843 A | * | 12/1993 | Chau et al. |
| 5,368,889 A | | 11/1994 | Johnson et al. ............. 427/244 |
| 5,547,575 A | * | 8/1996 | Demmer et al. |
| 5,733,602 A | | 3/1998 | Hirose et al. ............... 427/245 |
| 5,876,602 A | * | 3/1999 | Jons et al. |
| 5,922,203 A | * | 7/1999 | Tomaschke |
| 6,026,968 A | * | 2/2000 | Hachisuka et al. |
| 6,171,497 B1 | * | 1/2001 | Hirose et al. .......... 210/500.38 |
| 6,337,018 B1 | * | 1/2002 | Mickols |

FOREIGN PATENT DOCUMENTS

| | | |
|---|---|---|
| EP | 0 432 358 A1 | 6/1991 |
| JP | 63-218208 | 9/1988 |
| JP | 2-187135 | 7/1990 |
| JP | 4-161234 | 6/1992 |
| JP | 8-224452 | 9/1996 |

OTHER PUBLICATIONS

Richard J. Lewis, Sr., Hawley's Condensed Chemical Dictionary. 12th Edition, p. 257.*
Patent Abstracts of Japan, Publication No. 04161234, Publication date Jun. 4, 1992, 3 pages.
Cheng, R.; Glater, J.; Neethling, J.B.: Stenstrom, M.K.: "The Effects of Small Halocarbons on RO Membrane Performance": Desalination, pp. 33–44; 1991, Elsevier Science Publishers B.V.

* cited by examiner

Primary Examiner—Ana M. Fortuna
(74) Attorney, Agent, or Firm—Rosenthal & Osha L.L.P.

(57) ABSTRACT

A polyamide skin layer is formed on a porous support by reacting an aromatic compound having at least two reactive amino groups with a polyfunctional acid halide compound having at least two reactive acid halide groups. Then, the polyamide skin layer is treated with a free chlorine aqueous solution containing bromine compound. The resultant composite reverse osmosis membrane has a high rejection for substances that are not ionized at the pH range where the membrane is normally used.

5 Claims, No Drawings

COMPOSITE REVERSE OSMOSIS MEMBRANE AND METHOD FOR PRODUCING THE SAME

BACKGROUND OF THE INVENTION

1. Field of the Invention

The present invention relates to a composite reverse osmosis membrane for selectively separating components in a liquid mixture and a method for producing the same. More specifically, the present invention relates to a composite reverse osmosis membrane having a high rejection property provided by a polyamide-based skin layer (referred to also as an active layer or a thin layer) on a porous support and, and a method for producing such a composite reverse osmosis membrane.

2. Description of the Prior Art

Conventionally, a composite reverse osmosis membrane where a skin layer (active layer or a thin layer) for selective separation is formed on a porous support is known as a reverse osmosis membrane having a structure different than that of an asymmetric reverse osmosis membrane. One such example is a composite reverse osmosis membrane having a polyamide skin layer formed by interfacial polymerization between polyfunctional aromatic amine and polyfunctional aromatic acid halide on a porous support (e.g., JP 55-147106 A, JP 62-121603 A, JP 63-218208 A and JP 2-187135 A).

Some of the conventional composite reverse osmosis membranes have excellent desalination performance, water permeability performance and ionic substance-separation performance. However, the conventional composite reverse osmosis membranes do not have sufficient rejections for nonelectrolyte organic compounds such as isopropyl alcohol (IPA). Furthermore, the conventional composite reverse osmosis membranes do not have sufficient rejections for substances that are not dissociated at the pH range where they are normally used (e.g., boron). IPA is a substance that is widely used in the semiconductor industry and the like, and boron is a problematic substance in the conversion of seawater to freshwater. Therefore, development of a composite reverse osmosis membrane capable of separating these substances at high rejections is desirable.

SUMMARY OF THE INVENTION

Embodiments of the present invention provide a composite reverse osmosis membrane that has excellent desalination performance, water permeability performance and ionic substance-separation performance and is capable of separating nonelectrolyte organic compounds and nondissociative substances at the pH range where these composite reverse osmosis membranes are normally used (hereinafter, referred to also as "general pH range nondissociative substances") at a high rejection, and a method for producing the membrane.

In one aspect, the present invention relates to a composite reverse osmosis membrane including a porous support and a polyamide skin layer formed on the porous support, wherein the polyamide skin layer is formed by reacting an aromatic compound having at least two reactive amino groups with a polyfunctional acid halide compound having at least two reactive acid halide groups, and the polyamide skin layer contains bromine.

Such a composite reverse osmosis membrane of the present invention has excellent desalination performance, water permeability performance and ionic substance-separation performance and is capable of separating nonelectrolyte organic compounds such as IPA and general pH range nondissociative substances such as boron with high rejections.

In some embodiments of the composite reverse osmosis membrane of the present invention, bromine contained in the polyamide skin layer may be present in the form of bromine atoms or ions. The polyamide skin layer contains bromine, but can also contain other substances. However, when the polyamide skin layer has only chlorine, the rejection of nonelectrolyte organic compounds and general pH range nondissociative substances is not sufficiently improved. In one embodiment of the composite reverse osmosis membrane of the present invention, it is preferable that the aromatic compound portion of the polyamide skin layer has bromine. For example, the bromine atom substitutes for a hydrogen atom so as to be bound to a carbon atom of the aromatic ring of the aromatic compound.

In some embodiments of the composite revere osmosis membrane of the present invention, it is preferable that the ratio (Br/N) of the number of the bromine atoms (Br) to the nitrogen atoms (N) is not less than 0.1 and not more than 1.0. When this ratio is 0.1 or more, the nonelectrolyte organic compounds and the general pH range nondissociative substances can be separated at a higher rejection. When the ratio is 1.0 or less, the nonelectrolyte organic compounds and the general pH range nondissociative substances can be separated at a higher rejection, while the flux is not too low and the operational pressure is not too high, leading to economical advantages. A more preferable range of the ratio is not less than 0.15 and not more than 0.7, and a most preferable range is not less than 0.2 and not more than 0.5. In the specification, "flux" refers to a volume ($m^3$) of solution that permeates the membrane a day per $m^2$ of the area of one surface of the membrane. "Rejection" is expressed by Equation (1) below:

$$\text{Rejection } (\%) = (1 - (\text{the concentration of the permeate solution/the average concentration of the feed solution})) \times 100 \quad (1)$$

In some embodiments of the composite reverse osmosis membrane of the present invention, the IPA rejection at a temperature of 25° C., a pH of 6.5, and an operational pressure of 1.5 MPa is at least 98.5%, when a 0.3 wt % IPA aqueous solution is used as the feed solution. When the IPA rejection is at least 98.5%, the IPA concentration in the permeate water can be sufficiently reduced.

In some embodiments of the composite reverse osmosis membrane of the present invention, the salt rejection at a temperature of 25° C., a pH of 6.5 and a flux of 0.6 $m^3/m^2$·day is at least 99%, when a 3.5 wt % salt water containing 5 ppm of boron is used as the feed solution, and the boron rejection is at least 85% under those conditions. Bromine is present at about 4 to 5 mg/l in the seawater. In general, when the conversion from seawater to freshwater is performed by using a reverse osmosis membrane, a recovery ratio (the amount of the permeate water/the amount of the feed water) of 40% is obtained. When the boron rejection is 85% or more in operation at a recovery ratio of 40%, the concentration of boron in the permeate water is 0.7 to 0.9 mg/l when the concentration of boron in the feed seawater is 4 to 5 mg/l. This can be further reduced to a sufficiently low level for drinking water. More preferably, the boron rejection is 88% or more (further more preferably 90% or more). In this case, the concentration of boron in the permeate water is 0.6 to 0.7 mg/l. This embodiment can maintain a sufficiently low concentration of boron for drinking water, even if the performance is degraded by aging of the membrane and so on.

In another aspect, the invention relates to a method for producing a composite reverse osmosis membrane including forming a polyamide skin layer on a porous support by reacting an aromatic compound having at least two reactive amino groups with a polyfunctional acid halide compound having at least two reactive acid halide groups, and treating the polyamide skin layer with a free chlorine aqueous solution containing bromine compound.

In some embodiments, the concentration of free chlorine in the free chlorine aqueous solution is 1 to 100 mg/l. When it is 1 mg/l or more, the rejection of the resultant membrane for the nonelectrolyte organic compounds and the general pH range nondissociative substances is further improved. When it is 100 mg/l or less, the flux of the resultant membrane is acceptable. It is more preferable that the concentration of free chlorine is in the range from 5 to 50 mg/l.

It is preferable that the concentration of bromine in the free chlorine aqueous solution is in the range from 0.5 to 100 mg/l. When it is 0.5 mg/l or more, the rejection is further improved. When it is 100 mg/l or less, the flux is prevented from being reduced. It is more preferable that the concentration of bromine is in the range from 1 to 50 mg/l.

The free chlorine aqueous solution containing bromine compound can be prepared by, for example, dissolving a bromine compound and free chlorine in water. The bromine compound is not limited in any specific compound, as long as it can dissolve in water. Examples of the bromine compound include sodium bromide, potassium bromide, calcium bromide, magnesium bromide, ammonium bromide, lithium bromide, cadmium bromide, germanium bromide, cobalt bromide, strontium bromide, cesium bromide, tungsten bromide, iron bromide, tellurium bromide, copper bromide, barium bromide, manganese bromide, hydrogen bromide or the like. Among these, a bromine compound of an alkali metal or a bromine compound of an alkaline earth metal is preferable, and a bromine compound of an alkali metal is more preferable.

The pH of the free chlorine aqueous solution is, for example, in the range from about 4 to 11. It is preferable that the pH is 4 or more, because free chlorine is prevented from becoming less soluble. It is preferable that the pH is 11 or less, because bromine can be added to the polyamide skin layer more effectively. The pH is preferably in the range from 4 to 6.8, and is most preferably from 5 to 6.5.

Such a free chlorine aqueous solution containing bromine compound can be prepared, for example, by adding free chlorine to water that already contains bromine, such as seawater or well water and, if necessary, adjusting the pH to the desired range.

In the method for producing a composite reverse osmosis membrane of the present invention, the technique for the treatment process is not specifically limited. For example, it can be performed by immersing the polyamide skin layer in the free chlorine aqueous solution containing bromine compound, applying the free chlorine aqueous solution containing bromine compound to the polyamide skin layer, or the like. In addition, it is preferable that the treatment is performed under pressure because of its processing efficiency. For example, the treatment can be performed by passing the free chlorine aqueous solution containing bromine compound through the polyamide skin layer on porous support under pressure.

In the method of the present invention, it is preferable that a reduction in the flux of the composite reverse osmosis membrane by this treatment is at least 10% based on the flux before the treatment. The reduction of the flux is preferably not less than 20% and not more than 80%, and most preferably not less than 25% and not more than 70%. When the reduction of the flux is, for example, 90% or less, there is no concern that the operational pressure of the composite reverse osmosis membrane becomes too high. This is economically advantageous.

As described above, the composite reverse osmosis membrane of the present invention has excellent desalination performance, water permeability performance and ionic substance-separation performance, and can separate nonelectrolyte organic compounds and substances that are not dissociated at the pH range where the composite reverse osmosis membrane is normally used at a high rejection. This composite reverse osmosis membrane is suitable for production of ultrapure water, desalination of seawater or brackish water, or the like. Moreover, the composite reverse osmosis membrane of the present invention can be used to remove or recover contaminants or effective substances contained in industrial waste water such as dyed waste water or electroplating waste water, which causes environmental contamination. Thus, the composite reverse osmosis membrane of the present invention can contribute to the efforts to stop the waste water from being discharged. Moreover, in the field of food industry and so on, the composite reverse osmosis membrane of the present invention can be used for concentration of effective components, water treatment such as removal of toxic components of tap water or sewage water. In particular, in the production of ultrapure water, it is possible to remove IPA contained in a feed solution at a high rejection. In the desalination of seawater, it is not only possible to remove total dissolved solids (TDS) in the seawater, but also it is possible to remove boron, which is hard to remove because it is not ionized at the general pH range, at a high rejection, so that drinking water can be produced with one step of reverse osmosis membrane treatment.

These and other advantages of the present invention will become apparent to those skilled in the art upon reading and understanding the following detailed description.

DESCRIPTION OF THE PREFERRED EMBODIMENTS

A composite reverse osmosis membrane of the present invention is produced, for example, by reacting an aromatic compound having at least two reactive amino groups with a polyfunctional acid halide having at least two reactive acid halide groups so as to form a polyamide skin layer on a porous support and treating the polyamide skin layer on the porous support with a free chlorine aqueous solution containing bromine compound. In this application, bromine is used to denote bromine atom or ion instead of bromine molecule.

The aromatic compound having at least two reactive amino groups (hereinafter, referred to also as "polyfunctional amine") is not limited to a specific compound, and can be, for example, m-phenylene diamine, p-phenylene diamine, 1,3,5-triaminobenzene, 1,2,4-triaminobenzene, 3,5-diaminobenzoic acid, 2,4-diaminotoluene, 2,4-diaminoanisole, amidol, xylylene diamine, or the like. Preferably, m-phenylene diamine, p-phenylene diamine, or triaminobenzene can be used. Among these, m-phenylene diamine or triaminobenzene are more preferable.

In the present invention, a bromine atom is added to the polyamide skin layer. This addition of a bromine atom can be performed either before or after the reaction with the polyfunctional acid halide compound. However, it is preferable to add a bromine atom after the reaction because of its reactivity with the polyfunctional acid halide compound. A chlorine atom may be added to the polyamide skin layer, but is not necessary.

Further, these aromatic polyfunctional amines can be used in combination with aliphatic or alicyclic polyfunctional amines. Examples of such aliphatic polyfunctional amines include ethylene diamine, propylene diamine, and tris(2-aminoethyl) amine. Examples of such alicyclic polyfunctional amines include 1,3-diaminocyclohexane, 1,2-diaminocyclohexane, 1,4-diaminocyclohexane piperazine, 2,5-dimethyl piperazine, and 4-aminomethyl piperazine.

The polyfunctional acid halide (hereinafter, referred to also as "acid halide") is not specifically limited, and can be, for example, aromatic, aliphatic, or alicyclic polyfunctional acid halides. Preferably, aromatic polyfunctional acid halides can be used.

Examples of the aromatic polyfunctional acid halides include trimesic acid chloride, terephthalic acid chloride, isophthalic acid chloride, biphenyl dicarboxylic acid chloride, naphthalene dicarboxylic acid dichloride, benzene trisulfonic acid chloride, benzene disulfonic acid chloride, and chlorosulfonyl benzene dicarboxylic acid chloride. Among these, monocyclic aromatic compounds are preferable.

Examples of the aliphatic polyfunctional acid halides include propane tricarboxylic acid chloride, butane tricarboxylic acid chloride, pentane tricarboxylic acid chloride, glutaryl halide, and adipoyl halide.

Examples of the alicyclic polyfunctional acid halides include cyclopropane tricarboxylic acid chloride, cyclobutane tetracarboxylic acid chloride, cyclopentane tricarboxylic acid chloride, cyclopentane tetracarboxylic acid chloride, cyclohexane tricarboxylic acid chloride, tetrahydrofuran tetracarboxylic acid chloride, cyclopentane dicarboxylic acid chloride, cyclobutane dicarboxylic acid chloride, cyclohexane dicarboxylic acid chloride, and tetrahydrofuran dicarboxylic acid chloride.

The porous support is not limited to a specific type, as long as it can support the polyamide skin layer. For example, polyarylethersulfone such as polysulfone and polyether sulfone, polyimide, polyvinylidene fluoride, or the like can be used. Above all, a porous supporting membrane made of polysulfone or polyarylethersulfone is preferred because of its chemical, mechanical and thermal stability. This porous support generally has a thickness of about 25 to 125 $\mu$m, preferably about 40 to 75 $\mu$m, but the thickness is not necessarily limited thereto.

Next, the polyamide skin layer based on cross-linked polyamide is formed on a porous support by interfacial polymerization between the polyfunctional amine component and the acid halide component. For example, a solution containing the polyfunctional amine component is applied onto a porous support to form a first layer, and then a solution containing the acid halide component is applied onto the first layer to form a second layer on the first layer. Thus, interfacial polycondensation occurs so as to form a thin membrane (polyamide skin layer) made of cross-linked polyamide on the porous support.

The solution containing the polyfunctional amine further can contain a small amount of polymer such as polyvinyl alcohol, polyvinyl pyrolidone, polyacrylic acid or the like or polyhydric alcohol such as sorbitol, glycerin or the like to facilitate the production of the membrane or to improve the performance of the resultant composite reverse osmosis membrane.

Furthermore, a compound having a solubility parameter (described in JP8-224452A) of 8 to 14 $(cal/cm^3)^{1/2}$ can be added to the solution containing the polyfunctional amine component or the solution containing the acid halide component or both, for the purpose of increasing the flux. The solubility parameter refers to an amount defined by $(\Delta H/V)^{1/2}$ $(cal/cm^3)^{1/2}$, where the molar evaporative heat of a liquid is $\Delta H$ cal/mol, and the molar volume is V $cm^3$/mol. Examples of a substance having such a solubility parameter include alcohols, ethers, ketones, esters, halogenated hydrocarbons, and sulfur-containing compounds, and specific examples thereof are described in JP 8-224452A.

The amine salt described in JP 2-187135A, for example a salt of tetraalkyl ammonium halide or trialkyl amine and an organic acid can also be added to the solution containing polyfunctional amine or the solution containing an acid halide component or both, because such salt facilitates production of the membrane, improves the absorptivity of the amine solution to the support, and accelerates the condensation reaction.

The solution containing polyfunctional amine or the solution containing an acid halide component or both can contain a surfactant such as sodium dodecyl benzene sulfonate, sodium dodecyl sulfate, sodium lauryl sulfate or the like. These surfactants have the effect of improving the wettability and facilitate the absorption of the solution containing polyfunctional amine to the porous support.

In order to accelerate the polycondensation reaction at the interface, it is useful to add sodium hydroxide or tribasic sodium phosphate, which can remove hydrogen halide produced in the interfacial reaction, to the solution containing polyfunctional amine or the solution containing an acid halide component or both, or to use an acylation catalyst or the like as a catalyst.

The concentrations of the acid halide and the polyfunctional amine in the solution containing acid halide and the solution containing polyfunctional amine are not specifically limited. The concentration of the acid halide generally is 0.01 to 5 wt %, preferably 0.05 to 1 wt %, and the concentration of the polyfunctional amine generally is 0.1 to 10 wt %, preferably 0.5 to 5 wt %.

In this manner, the porous support is coated with the solution containing polyfunctional amine, and then it is coated with the solution containing a polyfunctional acid halide compound. Thereafter, extra solution is removed, then it is heated for drying generally at about 20 to 150° C., preferably at about 70 to 130° C. for about 1 to 10 minutes, preferably about 2 to 8 minutes, so as to form a thin water permeable membrane made of cross-linked polyamide. The thickness of this thin membrane generally is about 0.05 to 2 $\mu$m, preferably about 0.10 to 1 $\mu$m.

A laminate (a composite membrane) where the polyamide skin layer is formed on the porous support is then treated with a free chlorine aqueous solution containing bromine compound. As described above, it is preferable to perform this treatment under pressure. This pressure is in the range, for example, from 0.1 to 20 MPa, preferably 0.2 to 10 MPa, and more preferably 0.5 to 6 MPa.

Thus, the composite reverse osmosis membrane of the present invention is produced. It is confirmed, for example, by electron spectroscopy analysis (ESCA) that the polyamide skin layer in the composite reverse osmosis membrane of the present invention contains bromine.

EXAMPLES

Next, the present invention will be described more specifically by way of examples and comparative examples.

Example 1

An aqueous solution containing m-phenylene diamine (3 wt %), sodium lauryl sulfate (0.25 wt %), triethylamine (2 wt %) and camphor sulfonic acid (4 wt %) was applied to a porous support (polysulfone-based ultrafiltration membrane). Thereafter, extra aqueous solution was removed so that a layer of the aqueous solution was formed on the support. Afterwards, an isooctane solution containing trimesic acid chloride (0.1 wt %) and isophthalic acid chloride (0.15 wt %) was applied onto this layer, and then was held in an oven at 120° C. for 3 minutes so that a thin polymer membrane (polyamide skin layer) was formed on the porous support. Thus, a composite membrane was obtained. In this composite membrane, the average thickness of the porous support was 50 μm, and the average thickness of the polyamide skin layer was 0.2 μm. In the meantime, free chlorine (20 mg/l) and sodium bromide (10 mg/l, the amount of bromine was 7.8 mg/l) were dissolved in pure water so as to prepare a free chlorine aqueous solution containing bromine compound (pH around 5.2). This solution was passed through the composite membrane at an operational pressure of 1.5 MPa for 30 minutes so that the intended composite reverse osmosis membrane was obtained.

When the performance of this composite reverse osmosis membrane was evaluated at 25° C., pH 6.5, and an operational pressure of 1.5 MPa, using a 0.3 wt % IPA aqueous solution as the feed solution, the IPA rejection was 99.1% and the flux was 0.3 m³/m²·day. The reduction in the flux for this membrane was 50%, when compared with that of Comparative Example 1, which will be described later. When this composite reverse osmosis membrane was analyzed by ESCA for the constituent elements, the ratio (Br/N) of the bromine atoms (Br) to the nitrogen atoms (N) was 0.3.

Comparative Example 1

An aqueous solution containing m-phenylene diamine (3 wt %), sodium lauryl sulfate (0.25 wt %), triethylamine (2 wt %) and camphor sulfonic acid (4 wt %) was applied to a porous support (polysulfone-based ultrafiltration membrane). Thereafter, extra aqueous solution was removed so that a layer of the aqueous solution was formed on the support. Furthermore, an is octane solution containing trimesic acid chloride (0.1 wt %) and isophthalic acid chloride (0.15 wt %) was then applied onto this layer. The porous support was then held in an oven at 120° C. for 3 minutes so that a thin polymer membrane (polyamide skin layer) was formed on the porous support. Thus, a composite reverse osmosis membrane was obtained. In this composite reverse osmosis membrane, the average thickness of the porous support and the average thickness of the polyamide skin layer were the same as those of the composite membrane of Example 1. In the meantime, free chlorine was dissolved in a concentration of 20 mg/l in pure water to give a free chlorine aqueous solution. This solution was passed through the composite reverse osmosis membrane at an operational pressure of 1.5 MPa for 30 minutes.

When this composite reverse osmosis membrane was analyzed by ESCA for the constituent elements, there was no bromine detected and the ratio (Br/N) was 0. When the composite reverse osmosis membrane was evaluated at 25° C., pH 6.5, and an operational pressure of 1.5 MPa, using a 0.3 wt % IPA aqueous solution as the feed solution, the IPA rejection was 98% and the flux was 0.6 m³/m²·day.

Examples 2, 3 and 4

Composite reverse osmosis membranes were produced in the same manner as in Example 1, except that the pH of the free chlorine aqueous solution containing bromine compound was varied. The composite reverse osmosis membranes were analyzed for the IPA rejection and the ratio (Br/N) in the same manner as in Example 1. Table 1 shows the results.

TABLE 1

| Example | pH | IPA rejection (%) | Flux (m³/m² · day) | Br/N ratio |
| --- | --- | --- | --- | --- |
| 2 | 6.8 | 98.9 | 0.4 | 0.21 |
| 3 | 7.4 | 98.6 | 0.5 | 0.17 |
| 4 | 10.0 | 98.7 | 0.5 | 0.11 |

Example 5

A composite membrane was formed in the same manner as in Example 1, and was processed into a spiral module (a diameter of 201 mm and a length of 1016 mm). An aqueous solution with a pH of 6.0 containing free chlorine (20 mg/l) and sodium bromide (20 mg/l) was passed through the spiral module at an operational pressure of 1.5 MPa for 30 minutes so that a spiral module of the intended composite reverse osmosis membrane was obtained. When the performance of this spiral module was evaluated at 25° C., pH 6.5, a flux of 0.6 m³/m²·day and a recovery of 12%, using a 3.5 wt % salt water containing 5 ppm of boron as the feed solution, the operational pressure was 6.6 MPa, the salt rejection was 99.7% and the boron rejection was 92% (the concentration of boron in the permeate water was 0.4 mg/l). When this spiral module was dismantled and the composite reverse osmosis membrane was analyzed by ESCA for the constituent elements, the ratio (Br/N) was 0.24.

Comparative Example 2

The composite reverse osmosis membrane obtained in Comparative Example 1 was processed into a spiral module (a diameter of 201 mm and a length of 1016 mm). A free chlorine aqueous solution (20 mg/l, pH7) was passed through the spiral module at an operational pressure of 1.5 MPa for 30 minutes. When the performance of this spiral module was evaluated at 25° C., pH 6.5, a flux of 0.6 m³/m²·day and a recovery of 12%, using a 3.5 wt % salt water containing 5 ppm of boron as the feed solution, the operational pressure was 5.5 MPa and the salt rejection was 99.7% and the boron rejection was 84% (the concentration of boron in the permeate water was 0.9 mg/l).

Example 6

Six spiral modules of Example 5 were connected in series. The performance of this series of spiral modules was evaluated at a flux of 0.5 m³/m²·day and a recovery of 40%, using seawater (total dissolved solids (TDS) in the seawater of 3.7%, a concentration of boron of 4.7 mg/l, a pH of 6.3 and a temperature of 19° C.) as the feed solution. The results were that the operational pressure was 7.1 MPa and the TDS rejection was 99.9% and the boron rejection was 94% (the concentration of boron in the permeate water was 0.3 mg/l).

Comparative Example 3

Six spiral modules of Comparative Example 2 were connected in series. The performance of this series of spiral modules was evaluated under the same conditions as in Example 6. The results were that the operational pressure was 6.2 MPa and the TDS rejection was 99.8% and the boron reaction was 88% (the concentration of boron in the permeate water was 0.7 mg/l).

Examples 7 and 8

Composite reverse osmosis membranes were produced in the same manner as in Example 1, except that the concentration of the bromine compound contained in the free chlorine aqueous solution containing bromine compound was varied. The composite reverse osmosis membranes were analyzed for the ratio (Br/N) and the performance in the same manner as in Example 1. Table 2 shows the results.

TABLE 2

| Example | pH | Amount of added NaBr (mg/l) | Br concentration (mg/l) | IPA rejection (%) | Flux (m³/m²·day) | Reduction in the amount of permeate water in relation to the membrane of Comparative Ex. 1 (%) |
|---|---|---|---|---|---|---|
| 7 | 5.0 | 5 | 3.9 | 98.9 | 0.4 | 30 |
| 8 | 5.0 | 20 | 16 | 99.2 | 0.3 | 50 |

As seen in the above results, the composite reverse osmosis membrane of the present invention has a very high rejection of nonelectrolyte organic compounds such as IPA or general pH range nondissociative substances such as boron.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A composite reverse osmosis membrane comprising:
   a porous support;
   a polyamide skin layer formed on the porous support, wherein the polyamide skin layer is formed by reacting an aromatic compound having at least two reactive amino groups with a polyfunctional acid halide compound having at least two reactive groups; and
   wherein the polyamide skin layer contains bromide introduced into the polyamide skin layer by treating the polyamide skin layer with a free chlorine aqueous solution containing a bromine compound, at a pH in the range from 4 to 6.8; said bromide containing membrane being capable of separating non-ionic-compounds.

2. The composite reverse osmosis membrane according to claim 1, wherein the aromatic compound portion of the polyamide skin layer has bromine.

3. The composite reverse osmosis membrane according to claim 1, wherein a ratio (Br/N) of the number of bromine atoms (Br) to nitrogen atoms (N) of the amino groups is not less than 0.1 and not more than 1.0.

4. The composite reverse osmosis membrane according to claim 1, wherein an isopropyl alcohol rejection at a temperature of 25° C., a pH of 6.5, and an operational pressure of 1.5 MPa is at least 98.5%, when a 0.3 wt % isopropyl alcohol aqueous solution is used as a feed solution.

5. The composite reverse osmosis membrane according to claim 1, wherein a salt rejection at a temperature of ° C., a pH of 6.5, and a flux of 0.6 m³, m² day is at least 99%, when 3.5 wt % salt water containing 5 ppm of boron is used as a feed solution, and a boron rejection is at least 85% under those conditions.

* * * * *